United States Patent [19]

Ikekita

[11] Patent Number: 4,832,513
[45] Date of Patent: May 23, 1989

[54] METHOD AND APPARATUS FOR CREATING AN ARRANGEMENT FOR A LABEL

[75] Inventor: Minoru Ikekita, Kyoto, Japan

[73] Assignee: Kabushiki Kaisha Ishida Koki Seisakusho, Kyoto, Japan

[21] Appl. No.: 127,569

[22] Filed: Dec. 2, 1987

Related U.S. Application Data

[63] Continuation of Ser. No. 874,806, Jun. 13, 1986, abandoned, which is a continuation of Ser. No. 712,916, Mar. 18, 1985, abandoned, which is a continuation of Ser. No. 474,343, Mar. 11, 1983, abandoned.

[30] Foreign Application Priority Data

Mar. 11, 1982 [JP] Japan ............................... 57-039217
May 22, 1982 [JP] Japan ............................... 57-086878
May 22, 1982 [JP] Japan ............................... 57-086879

[51] Int. Cl.⁴ ............................................. G06F 11/00
[52] U.S. Cl. ..................................... 400/61; 400/76; 177/4
[58] Field of Search ................ 400/63, 64, 76, 83; 177/2, 3, 4, 25, DIG. 3, 25.11, 25.12, 25.19; 364/405, 466, 518, 519, 521

[56] References Cited

U.S. PATENT DOCUMENTS

| | | | |
|---|---|---|---|
| 2,707,913 | 5/1955 | Russell et al. | 101/91 |
| 3,961,747 | 6/1976 | Small et al. | 177/3 |
| 3,984,667 | 10/1976 | Loshbaugh | 177/DIG. 3 |
| 4,229,794 | 10/1980 | Foster | 177/4 |
| 4,375,922 | 3/1983 | Maegawa et al. | 400/110 |
| 4,398,253 | 9/1983 | Karp et al. | 177/25 |
| 4,423,486 | 12/1983 | Berner | 177/25 |
| 4,457,638 | 7/1984 | Horn et al. | 400/76 |

FOREIGN PATENT DOCUMENTS

| | | |
|---|---|---|
| 0020920 | 1/1981 | European Pat. Off. |
| 1444533 | 8/1976 | United Kingdom . |
| 1503196 | 3/1978 | United Kingdom . |
| 2077970 | 12/1981 | United Kingdom . |

Primary Examiner—David A. Wiecking
Attorney, Agent, or Firm—Staas & Halsey

[57] ABSTRACT

A label printing system includes an input device, a memory, a CRT display device, a printing mechanism, registration means and label printing means. The input device has manual data input means, for entering label creation data, and edits the data to provide an entry of label creation information. The memory stores the input data and the label creation information after by editing, and the information is displayed on the screen of the CRT and printed by the printing mechanism. The registration means is adapted to register the label creation data and information in the memory. The label printing means causes the information to be displayed on the screen of the CRT and causes the printing mechanism to print out the information on a label.

3 Claims, 7 Drawing Sheets

| December 9 1981 (Wednesday) | 3 : 30 PM |
|---|---|
| Beef : Sirloin "shabu - shabu" | |
| Net weight (g) | Price (yen) |
| 500 | 5000 |
| Price per 100g (yen) | Class    Code |
| 1000 | 50  ·  11001 |
| Processing Date<br>12 - 9 - 81 | Best If Used By :<br>12 - 12 - 81 |

```
Enter numerals and press SET key
    N₁           N₂          N₃
Call No.  · Class No.· Code No.
 | 1000    |   20    ·  01011   |
TUNA  ( 3 Slices )

UNIT   PRICE           380 (Yen)
        FIXED  WEIGHT               (g)
        FIXED  PRICE               (Yen)
        EFFECTIVE PERIOD         2 (days)
```

```
Enter 1 for YES and 0 for NO, and
press SET Key

AUTOMATIC    PRINT              ( 01 )
ADD                             ( 00 )
PRINT PROCESSING DATE           ( 01 )
                                  ⋮
PRINT BAR CODE                  ( 01 )
```

```
Enter numerals and press SET key        375
371      BEEF ; SIRLOIN STEAK
372      BEEF ; SIRLOIN SUKIYAKI
373      BEEF ; SLICED RIB ROAST
374      BEEF ; RIB ROAST STEAK
375      BEEF ; RIB ROAST SHABU - SHABU
376      BEEF ; RIB ROAST SUKIYAKI
377      BEEF ; SHOULDER ROAST SUKIYAKI
378      BEEF ; SLICED SHOULDER ROAST
379      BEEF ; SHOULDER ROAST SHABU - SHABU
380      BEEF ; ROUND SHABU - SHABU
381      BEEF ; ROUND SUKIYAKI
382      BEEF ; SLICED ROUND
383      BEEF ; ROUND BARBECUE
```

Fig. 9

| December 9 1981 (Wednesday) | 3 : 30 PM |
|---|---|
| Beef : Sirloin "shabu - shabu" | |
| Net weight (g) | Price (yen) |
| 500 | 5000 |
| Price per 100g (yen) | Class  Code |
| 1000 | 50 · 11001 |
| Processing Date<br>12 - 9 - 81 | Best If Used By :<br>12 - 12 - 81 |

METHOD AND APPARATUS FOR CREATING AN ARRANGEMENT FOR A LABEL

This is a continuation of co-pending application No. 874,806 filed on June 13, 1986, now abandoned, which is a continuation of No. 712,916 filed on March 18, 1985, now abandoned, which is a continuation of No. 474,343 filed March 11, 1983 now abandoned.

BACKGROUND OF THE INVENTION

This invention relates to a method and apparatus for printing labels to be attached to articles of merchandise or produce.

In printing labels that are to be attached to a product, a label printer is used in cooperation with a scale when selling products at a price based on weighed out amounts which may differ from one another, that is, when selling by weight. The label printer is not used in association with a scale, however, when products are sold at a fixed price. With the conventional label printer, stamps bearing the names of the products are prepared in advance for each kind of product, a stamp for one kind of product is changed and replaced by the proper stamp each time the kind of product changes, and information such as unit price relating to the name of a particular product is entered through a manual operation. The conventional label printer therefore is not only complicated to use but also is high in cost owing to the large number of stamps which are necessary, these totaling as high as 200 to 300 in many cases.

Such information as the name of a product as well as its unit price and price when sold by weight is essential when issuing labels to be affixed to the products or when totalizing proceeds In conventional printing of labels for products to be sold by weight, in which use is made of an electronic scale, or even when the products are sold in fixed amounts or at a fixed price without relying upon the electronic scale, the arrangement is such that the stamps bearing the names of the products are removably placed within the printer to effect printing on the labels. This means the number of stamps provided must equal the number of product categories, necessitating numerous stamps when the number of product categories is large. Though characters stating, say, "unit price" are printed out on labels in advance in instances where this is permitted, the numerals indicating the unit price are printed by a numeral printing device incorporated within the printer proper. Thus it is necessary to provide a printing device for product names and a printing device for numerals, resulting in a printer that is structurally complex and correspondingly high in cost.

In order to eliminate the shortcomings encountered in the prior-art apparatus requiring the multiplicity of stamps for printing the product names, Japanese Laid-Open Patent Publication Nos. 56-119815 and 56-119816 disclose a label printing apparatus which includes an input device, a central processing unit (CPU), a random access memory (RAM), a read-only memory (ROM) and a label printer, wherein characters stored previously in the ROM are combined to form the name of a product in response to an input from the input device. The operator registers in the RAM memory the code numbers of products as well as product name keywords made up of characters constituting the names of the products. By subsequently entering a code number through use of the input device, the name of a product can be called from memory and printed out on a label by means of the label printer. With the above-described apparatus, however, the operator registers the name of a product by entering the product name keyword while observing, say, a table showing the correspondence between characters and the keywords made up of these characters. In order to verify whether the data actually registered is correct or not, the operator must actuate the label printer each time to print out the name of the product (the characters corresponding to the particular keyword) on a label. This is an extremely time-consuming procedure.

SUMMARY OF THE INVENTION

Accordingly, an object of the present invention is to provide a label printing apparatus in which information to be printed on a label can be verified for correctness in a simple manner without first printing out the information in a trial run.

Another object of the present invention is to provide a label printing apparatus in which labels can be printed on without preparing stamps for product names and without requiring manual entry of particulars such as unit price whenever the type of product changes.

Still another object of the present invention is to provide a label printing apparatus in which such information as product name necessary for selling articles of produce or the like is handled centrally by a control device such as a CPU and is registered in a memory device so that the information can be issued in the form of labels or displayed by means of a display device such as a cathode ray tube, and in which the registered information can be checked for correctness during the registration operation.

According to the present invention, these and other objects are attained by providing a label printing apparatus comprising manual data input means for providing label creation information by entering label creation data and editing the data, memory means for storing the entered data and the label creation information obtained by editing the data, cathode ray tube display means for displaying the label creation data, a printing mechanism for printing the label creation data, registration means for registering the label creation data and label creation information in the memory means, and printing means for causing the label creation information to be displayed on the display means and printed by the printing mechanism.

Other features and advantages of the present invention will be apparent from the following description taken in conjunction with the accompanying drawings.

DESCRIPTION OF THE PREFERRED EMBODIMENT

Figure 1:
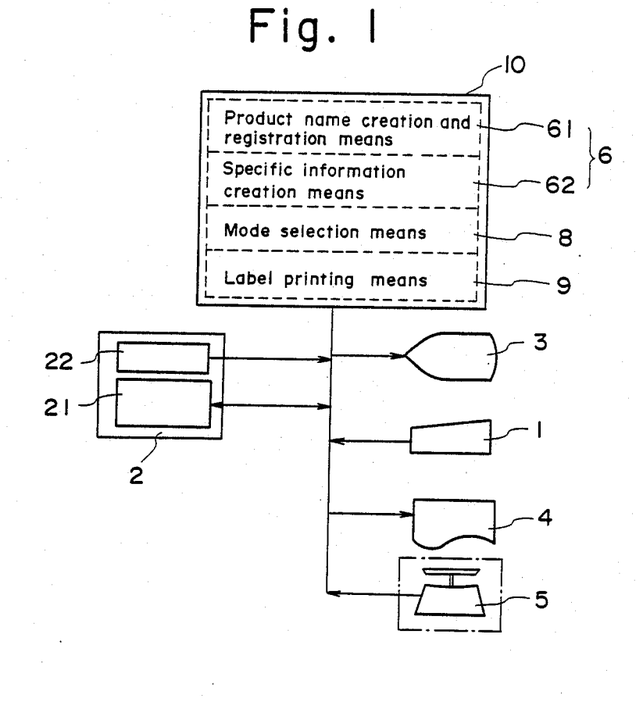
FIG. 1 is a block diagram illustrating the general features of the present invention.

Reference will first be had to FIG. 1 showing the general features of the present invention for a case where a label printing apparatus, used for selling products at a price determined by weight or at a fixed price, is realized through use of a central processing unit. The apparatus includes an input device 1 comprising manual data input means such as a ten-key arrangement and a setting key, a memory device 2 comprising a RAM 21 and a ROM 22, a cathode ray tube (CRT) display device 3 capable of displaying various characters, a printing device 4 such as a thermal printer capable of printing desired information on a label in accordance with input information, and a central processing unit (CPU) 10. Designated at numeral 5 is an electronic scale for sensing the weight of a product and for calculating the price of the product based on the sensed weight and unit price. The scale 5 is necessary only when selling products based on the weight thereof.

For controlling all of the units mentioned above, the CPU 10 is programmed to perform the function of registration means 6, mode selection means 8 and label printing means 9, all of which will now be described in detail.

First, in order to print such particulars as the name of a product and unit price on a label, information necessary for printing the same on the label must be stored in the memory device 2 in advance. This is accomplished by registration means 6 programmed in the CPU 10. The registration means 6 comprises means 61 for creating and registering the name of an article, and information registration means 62 for registering, e.g., unit price and specific information relating to the particular product.

Figure 2:
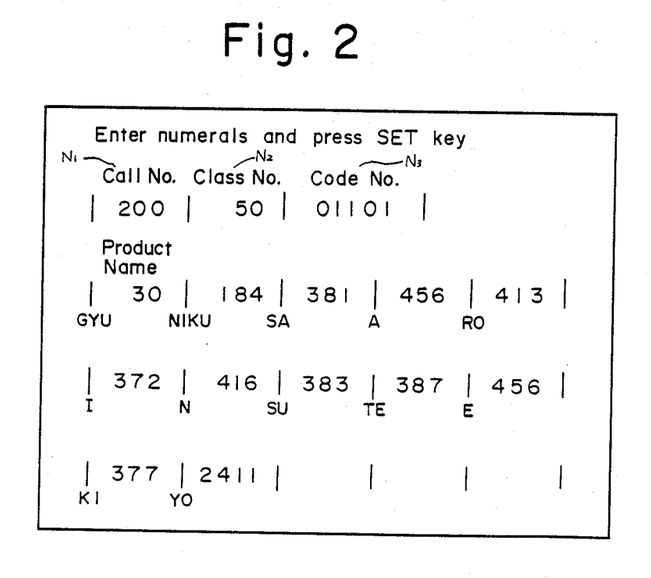
FIG. 2 is a plan view of a display for creating the name of a product.
Figure 3:
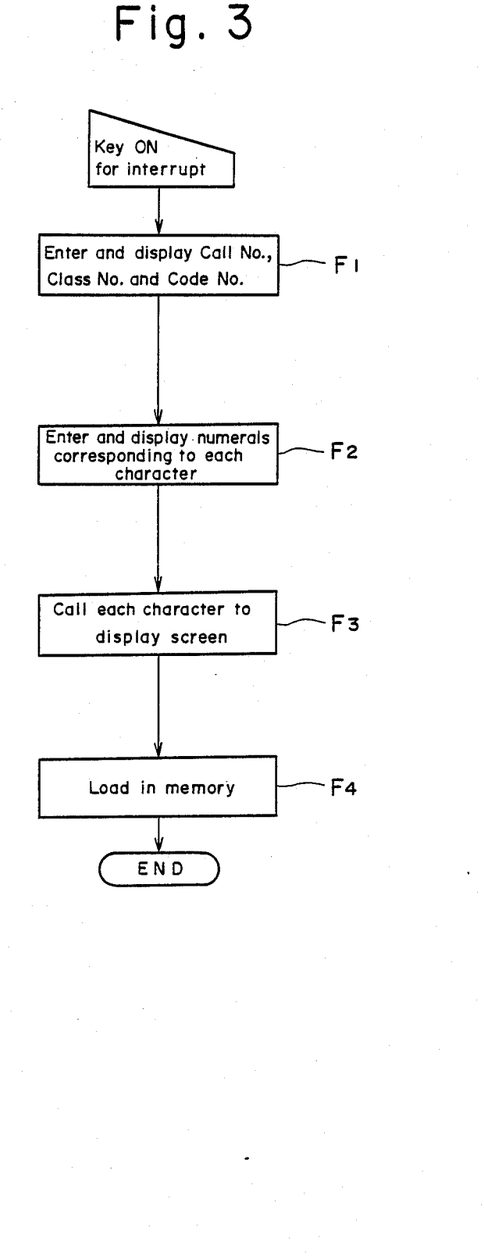
FIG. 3 is a flowchart illustrating the general steps for creating the name of a product.

Reference will be had to FIG. 2 to describe the creation and registration means 61. FIG. 2 illustrates an example of a display presented by the CRT display device 3 when creating the name of a product using means 61. (In the illustrated example, the product name is indicated in Japanese written out in Roman characters, with GYU, for example, corresponding to the first character [Kanji] of the original Japanese, and YO corresponding to the last character. As will be understood from the following description, GYU will correspond to an address 30, NIKU to an address 184, and so on. The English translation of the Japanese would read: "BEEF; SIRLOIN STEAK".) The flowchart of the steps involved is shown in FIG. 3. First, as indicated in block F1, the operator goes to the ten-key arrangement on the input device 1 and keys in a call number N1, class number N2 and code number N3 to be assigned to a prescribed product name, these numbers appearing on the screen of the CRT display device 3. The call number N1 is a number which, by being subsequently entered when a label is to be printed or whenever necessary, causes the name of a product, entered in a manner described later, as well as information relating to the product name, to be displayed on the CRT display screen. The class number N2 and code number N3 are numbers which the user employs for reference purposes.

Figure 4:
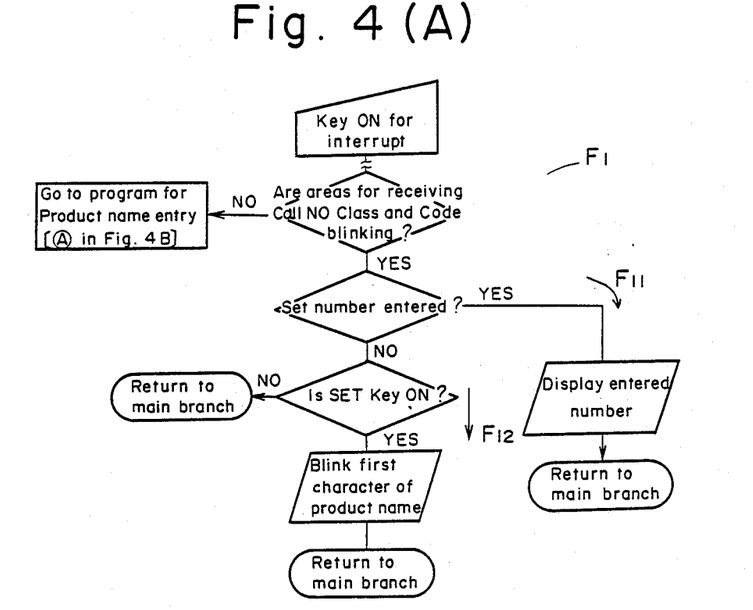
FIGS. 4A and 4B are flowcharts illustrating the steps for creating the name of a product in greater detail.

FIG. 4A is a flowchart showing, in greater detail, the steps involved in displaying the abovementioned numbers on the CRT display screen. Branch F11 shows that the operator enters the call, class and code numbers N1, N2, N3 in succession. Finally, in branch F12, the operator presses a SET key (not shown) on the input device 1 to shift the process to block F2 for the creation of a product name, as will be described below.

In step F2, namely after the abovementioned numbers appear on the display screen, the operator enters information for creating the name of a product. This is done by entering numerals (namely an address number) corresponding to each character (or Kanji, e.g., GYU, NIKU, etc., in the original Japanese) making up the name of a product stored previously as label creation data in the ROM 22, or numerals (an address number) corresponding to each product name stored previously in the ROM 22. Entering the numerals causes the product name to be displayed as label creation information on the CRT display screen in step F3. FIG. 2 shows what will appear on the CRT display screen when creating a product name by entering successively the indicated numerals which correspond to each character constituting the name of the product. FIG. 4B is a flowchart showing the associated steps in detail. Specifically, after the numbers N1, N2, N3 have been entered (at which time a location on the CRT display screen into which the first character of the product name is to be entered will begin blinking), the operator proceeds to enter the numerals correponding to the first character of the product name (branch F21). The operator then presses the SET key, thereby causing the screen to blink at the proper location to enable entry of the numerals for the next character of the product name (branch F22). The operator repeats this process to enter all the characters constituting the name of the product (F2', F2', ..., F2$^{n'}$). After entering the last character of the product name by pressing the SET key, the display will be blinking at the position where the next numeral would have been entered. Pressing the SET key again at this time rather than entering a numeral will cause the characters corresponding to each set of numerals to be displayed as the product name on the screen of the CRT display device 3 and cause the same to be loaded in the RAM 21 of the memory device 2 (step F4). The operator may now verify whether the information such as the cell number and product name displayed on the CRT screen is correct or not. The foregoing procedure is repeated if an error is detected.

Next, there are instances where, say, unit price and other information peculiar to the particular product are printed on a label that will be attached to the product, or where they are used to calculate, e.g., product price even when they are not printed out on the label. The CPU 10 in FIG. 1 is therefore programmed to perform the function of the specific information registration means 62 for registering, and for revising when required, numerical values corresponding to unit price, to weight and product price when selling products at a fixed weight, to product price when selling products at a fixed price, and to the effective period of, say, the unit price for that product.

Figure 5:
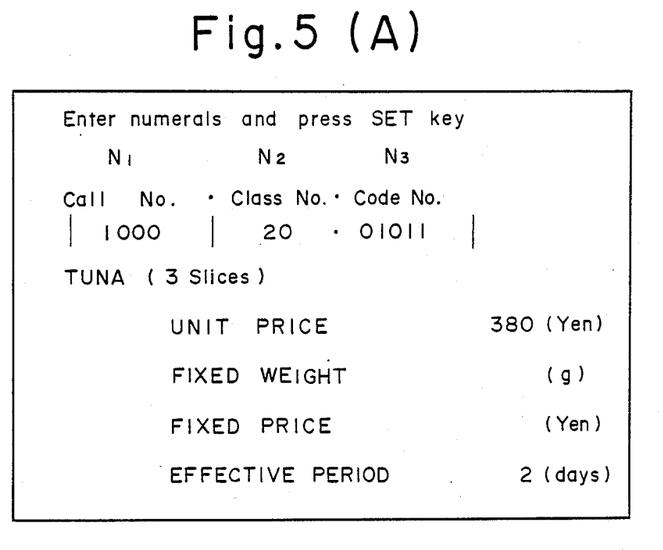
FIG. 5A is a plan view of a display for registering items of information peculiar to a certain product.
FIG. 5B is a flowchart illustrating the general steps for registering items of information using the display shown in FIG. 5A.

Reference will be had to FIGS. 5A and 5B to describe the registration means 62, in which FIG. 5A shows an example of a display presented by the display device 3 when registering "UNIT PRICE" and "EFFECTIVE PERIOD", and FIG. 5B shows the associated flowchart. First, in block F23, the operator enters numerals to display them in the call number area of the display screen. He then presses the SET key in block F24 to call the product name as well as items such as "UNIT PRICE", "FIXED WEIGHT", "FIXED PRICE", and "EFFECTIVE PERIOD", these appearing on the left side of the display screen. Then, in block F25, the operator enters the unit price of the product opposite the item "UNIT PRICE" and enters the effective period (as is common for foodstuffs) opposite the "EFFECTIVE PERIOD" item. This is followed by loading these items of information in the RAM 21 of the memory device 2 (block F26).

The kind of information peculiar to a product differs depending upon the conditions of sale. For example, when selling at a fixed price, it is necessary to indicate the price in the "FIXED PRICE" column of he label. Similarly, when selling at a fixed amount, the weight must be indicated in the "FIXED WEIGHT" column of the label. In such cases the abovementioned price and weight will be the specific information loaded in the memory device 2 in block F26.

Next, particulars to be printed on a label are selected at will depending upon the product, place of sale or sales method. A selection is also made as to whether or not prices are to be added, depending upon whether totalizing is necessary. To these ends, the CPU 10 is programmed to function as the mode selection means 8 which makes it possible to select the item to be printed by the printing device 4 as well as whether or not prices are to be added. The mode selection means 8 will now be described with reference to FIG. 6.

Figure 6:
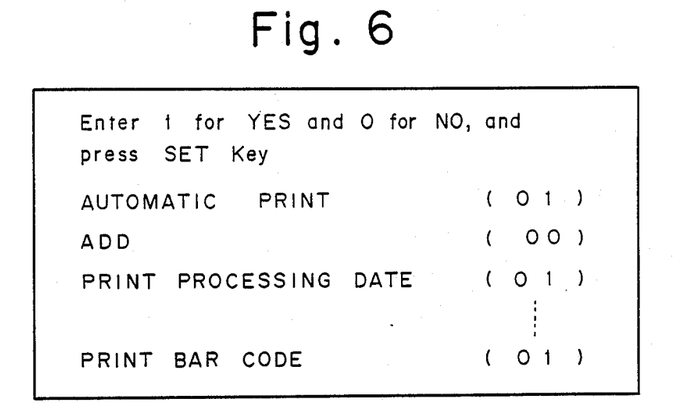
FIG. 6 is is a plan view of a display for selecting operating modes.
Figure 7:
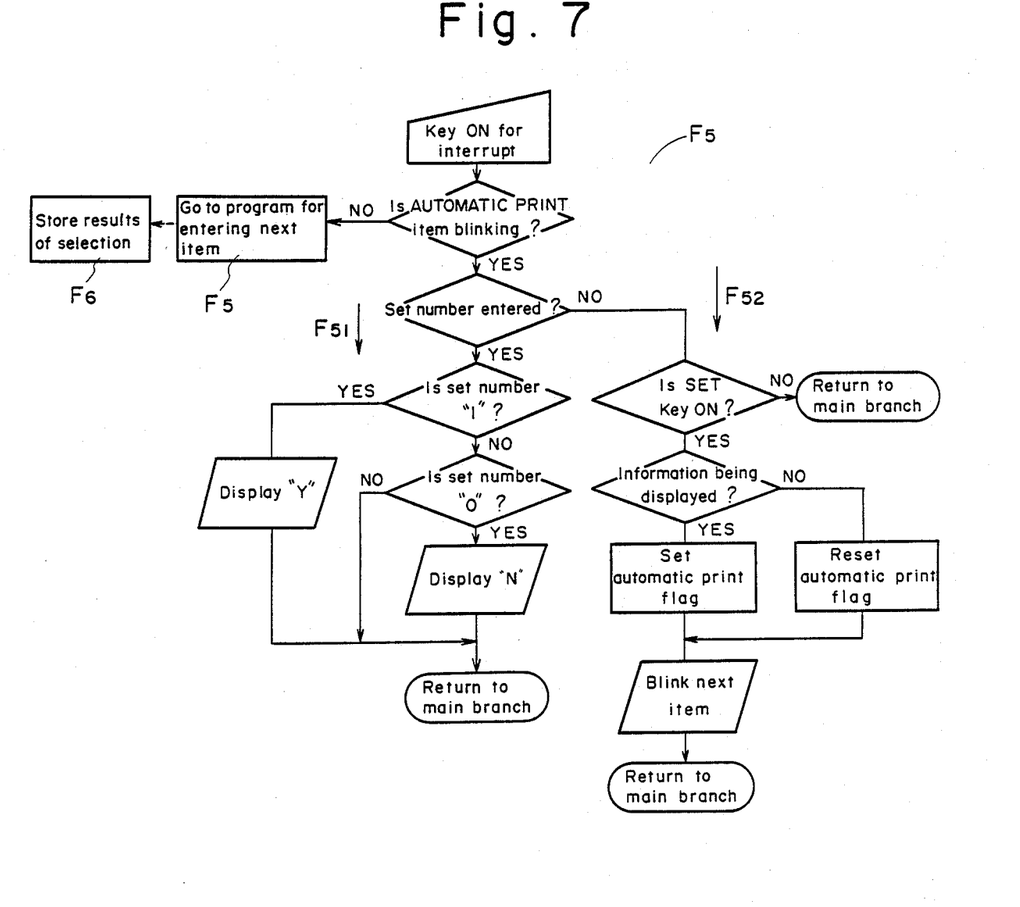
FIG. 7 is a flowchart illustrating the steps for selecting operating mode.

FIG. 6 shows an example of a display presented by the CRT display device 3 when selecting operating mode. The operator begins by calling up the items specifying each of the modes, as illustrated in FIG. 6, followed by entering "YES" or "NO" opposite each item. A flowchart showing the process steps followed when the "AUTOMATIC PRINT" item is selected is illustrated in FIG. 7. The flowchart of FIG. 7 shows the process steps for deciding whether to automatically print, e.g., weight, unit price and product price at stabilization of the weighing operation performed by the electronic scale 5. In branch F51, the operator enters a numerical value ("1" for "YES" or "0" for "NO"), whereby a YES or NO decision is rendered for the "AUTOMATIC PRINT" item. If the operator presses the SET key (key ON) in branch F52 and this is followed by a YES decision, an automatic print flag is set; if followed by a NO decision, then the flag is reset. In either case the next block is F5 for selecting the next item, i.e., mode, from the menu of FIG. 6. The operator may then repeat the foregoing steps for setting up the "ADD", "PROCESSING DAY" modes, etc. When completed, the results of the selection operations will be stored in the RAM 21 of memory device 2. This step is represented by block F6.

Figure 8:
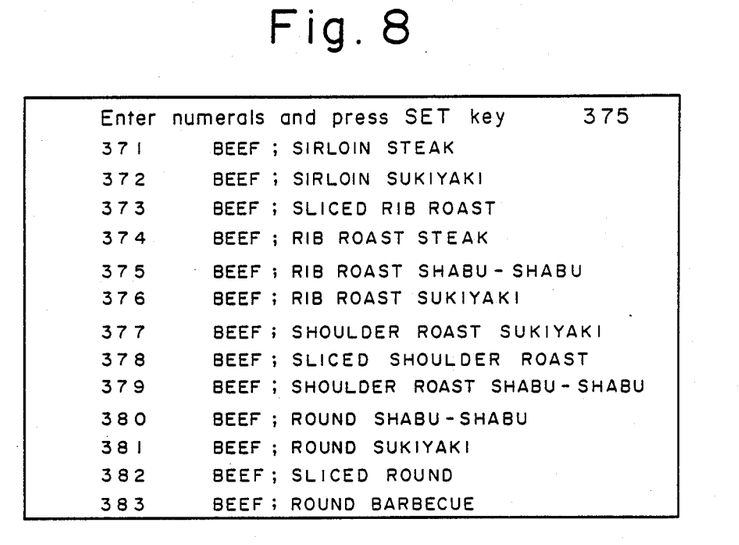
FIG. 8 is a plan view of a display showing a list of call numbers and product names.
Figure 9:
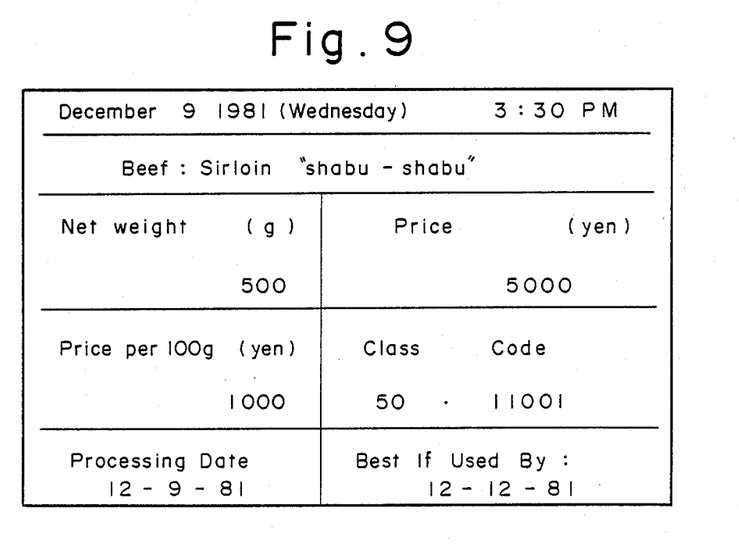
FIG. 9 is a plan view of a display showing an example of information to be printed on a label for issue.
Figure 10:
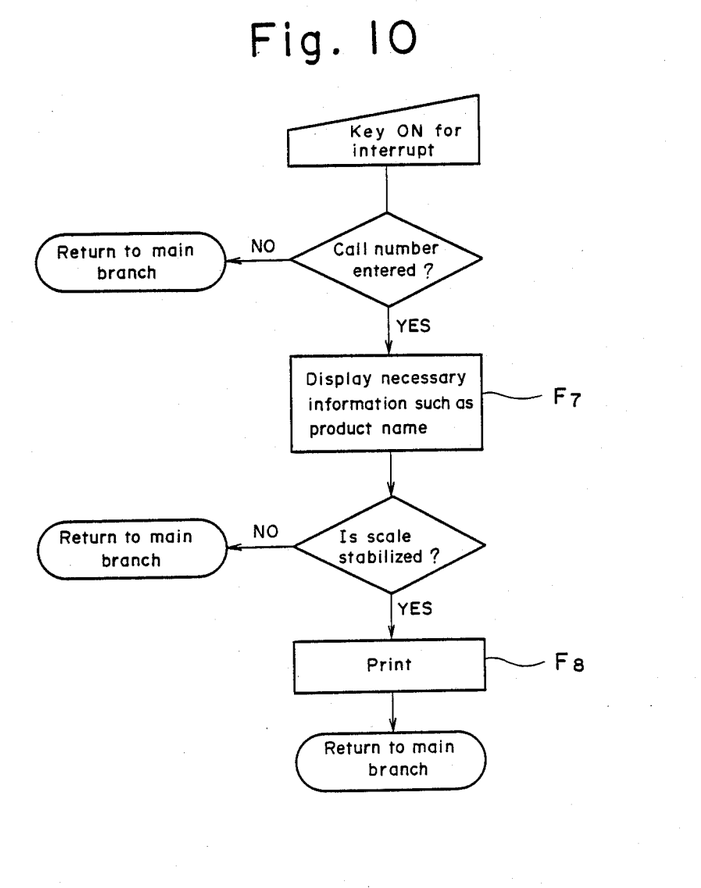
FIG. 10 is a flowchart depicting the steps for calling the display shown in FIG. 9 and for printing out the information shown on the display.

The ultimate objective of the invention is to issue a printed label. The CPU 10 therefore is programmed to function as the label printing means 9 for displaying on the screen of the CRT display device 3, and for printing on a label by means of the printing device 4, the pertinent information mentioned above, this being done in a predetermined style conforming to the set mode. Specifically, as illustrated in FIG. 8, the CRT display device 3 displays a list of call numbers and corresponding product names. The operator responds by entering the numerals of the call number corresponding to the desired product name, the entered numerals (375 in this case) appearing at the upper right of the screen, and by pressing the set key. This causes the information that is to be printed on a label for a desired product to appear on the CRT screen in the form shown in FIG. 9. This is step F7 the associated printing flowchart depicted in 10.

When selling a product at a price a weighed out quantity of the product, where product has already been placed on the electronic 5, the price will be displayed in the "PRICE" ar the weight in the "NET WEIGHT" area. In such the CRT display device 3 also performs the function the conventional display device using The processing date may be handled as one of t various items of information peculiar to the or may be entered by the ten-key arrangement of the device 1 whenever a label is issued. The item "WHEN USED BY:" is obtained by adding the effective stored previously in the RAM 21 of the device 2, to the processing date. The addition is performed automatically by the CPU. The time indicated at the top of the display screen FIG. 8 are displayed based on time kept by an internal clock.

Upon confirming the correctness of the displayed information, the operator issues a print command in response to which the displayed information is printed out on a label. In a case where the automatic print mode is designated when selling a product at a price based on a weighed out value, the printing device will be set into action with stabilization of the scale 5. This is step F8 is the flowchart of FIG. 10.

In accordance with the present invention as described and illustrated hereinabove, the operator inserts necessary particulars into memory beforehand while observing the screen of the CRT display device 3, calls up a desired product name and information relating thereto by entering a call number when a label is to be issued, causes whatever is to be printed on a label to be displayed on the screen and then has the printing apparatus print the displayed information intact. The printing apparatus therefore need not rely upon stamps bearing product names, so that stamps need not be switched whenever the type of product changes. It is also unnecessary to enter manually information relating to the name of a product.

Also, by pressing keys on the input device 1, the operator creates a product name by combining characters stored previously in the ROM 22 and registers the product name in the RAM 21. Information other than the product name is also registered in the RAM 21. Information so registered can be displayed on the CRT display device 3 for visual confirmation thereof.

Further, in accordance with the invention, information to be printed on a label can first be displayed on the CRT display device 3 to enable a visual check for correctness in a simple manner. This improves the efficiency of the label printing operation.

As many apparently widely different embodiments of the present invention can be made without departing from the spirit and scope thereof, it is to be understood that the invention is not limited to the specific embodiments thereof except as defined in the appended claims.

I claim:

1. A label printing apparatus for a label to be attached to a commodity, comprising:

first memory means for storing, in correspondence to a respective call number, commodity name information and specific information of a commodity for which the label is to be printed;

commodity name creation and registration means for creating a commodity name corresponding to the call number, based on prestored information, including second memory means having characters stored at respective addresses and means for sequentially combining said stored characters by selectively inputting the respective address for each said character, and for registering the created commodity name in said first memory means for storage;

specific information registration means for selectively inputting said specific information for the commodity corresponding to said call number and for registering same in said first memory means;

weighing means for weighing said commodity, wherein said specific information that is selectively printed on said label includes the unit price and the weight of said commodity;

mode selection means for selecting a printing mode for printing said label with respective parts of said commodity name and said specific information, said selecting of the printing mode being effected by setting an automatic printing mode flag when an automatic printing mode is selected, and resetting the automatic printing mode flag when the automatic printing mode is not selected;

display means for displaying a desired call number and the name of a commodity corresponding to the desired call number and for displaying only after selecting of the printing mode, necessary items corresponding to the selected printing mode out of the specific information prestored in said memory and corresponding to said call number, together with the call number and the commodity name;

label printing means for printing the label according to what is displayed by the display means after the weighing thereof is stabilized and the printing mode has been selected;

means for correcting the displayed specific information prior to said printing of the label; and input means including a 10-key arrangement and a set key for operating said commodity name creation and registration means, said specific information registration means, said mode selection means, said display means, said means for correcting and said label printing means;

wherein said commodity name creation and registration means, said specific information registration means, said mode selection means and said label printing means are formed by a central processing unit.

2. A method for printing a label to be attached to a weighed commodity, comprising the steps of:

creating the name of the commodity in correspondence to a call number and commodity name creating information entered from an input device, and registering in a memory the created commodity name in correspondence to said call number;

displaying in correspondence to said call number, and selectively inputting in correspondence to said call number, respective information specific to said commodity, which specific information consists of a plurality of items, and subsequently registering said specific information in a memory;

displaying a desired call number and the name of a commodity corresponding to the desired call number on a display;

after the desired call number and the name of the commodity have been displayed on the display, selecting a desired printing mode from a plurality of printing modes;

displaying, only after selecting the desired printing mode, necessary items corresponding to the selected printed mode, out of the specific information prestored in said memory and corresponding to said call number, together with the call number and the commodity name; and printing said label according to the display, wherein the selecting of the printing mode includes selecting whether the price is to be printed automatically on said label after the weighing of said commodity is stabilized, and whether the effective date of said commodity is to be printed on said label, and said creating of the commodity name includes sequentially combining characters prestored at respective addresses in a further memory by sequentially inputting the respective address of said further memory for each said character of the commodity name to be created.

3. The method of claim 2, further comprising the steps of:

displaying a list of call numbers of plural commodities for which the labels are to be printed and the commodity names corresponding to said call numbers, wherein all of said call numbers and commodity names are stored in said memory;

weighing said commodity; and selecting whether the price for each said label that is printed for said commodity is to be totalled, wherein said specific information that is printed on said label includes the unit price and the weight of said commodity.

* * * * *